United States Patent Office 3,299,126
Patented Jan. 17, 1967

3,299,126
PROCESS FOR OXIDIZING QUINODIMETHANES TO FORM AROMATIC CARBOXYLIC ACIDS
Louis A. Errede, Roseville, Minn., assignor to Minnesota Mining and Manufacturing Company, St. Paul, Minn., a corporation of Delaware
No Drawing. Original application Sept. 4, 1962, Ser. No. 221,375. Divided and this application Aug. 11, 1965, Ser. No. 493,292
4 Claims. (Cl. 260—524)

This application is a division of my prior and copending application Serial No. 221,375, filed September 4, 1962.

This invention relates to new improvements in the chemistry of quinodimethane (xylylenes).

It is known that p-xylene and related compounds may be pyrolyzed so as to prepare polymers. It is also known that pyrolysis of p-xylene and related compounds may be carried out in a manner so as to quench the pyrolyzate prior to the preparation of a polymer. In this manner, monomeric quinodimethanes are prepared in solution form. The solution may then be utilized to react by various mechanisms so as to form a variety of polymers and compounds.

It is an object of this invention to expand upon the technology relating to the pyrolysis of p-xylene and related compounds, especially as it pertains to preparation and use of quinodimethanes.

Another object is to teach various techniques for increasing the yield of quinodimethanes during pyrolysis.

Another object is to teach reacting a quinodimethane with $NO_2$.

Another object is to teach the gas phase synthesis of an organic compound by reacting dissimiliar free radical sources. Various other objects and advantages of the present invention will become apparent to those skilled in the art from the accompanying description and disclosure.

The term "quinodimethane" as used herein means an organic compound having a diunsaturated six-membered cyclic nucleus having each of two carbon atoms of the diunsaturated ring doubly bonded to the carbon atom of a methylene group. The methylene group may be substituted or unsubstituted. The diunsaturated ring which is common to each of the quinodimethanes will be positioned according to whether the methylene groups are ortho or para to each other. The preferred quinodimethanes of this invention are those having a symetrically diunsaturated six-membered ring to which a methylene group is doubly bonded to para-positioned carbon atoms of the ring. The term quinodimethane as used herein includes those compounds which contain only the one ring such as, for example, in p-quinodimethane (also called p-xylylene) which has the structure:

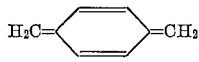

as well as those compounds in which the quinoid ring is fused to one or more aromatically unsaturated six-membered rings such as, for example, in 1,4-naphthaquinodimethane which has the structure:

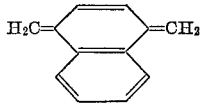

The aromatically unsaturated ring which is fused to the ring is referred to herein as the benzenoid ring.

It is to be understood that the quinodimethane starting material of this invention may be a carbocyclic compound, i.e. a cyclic compound in which each atom of the cyclic skeleton is a carbon atom such as in p-quinodimethane and 1,4-naphthaquinodimethane; or it may be a nitrogen-containing heterocyclic compound, i.e. a compound having at least one nitrogen atom as part of the cyclic skeleton. The heterocyclic compounds are preferably those in which the nitrogen is vicinal only to carbon and include those in which nitrogen is a constituent of the quinoid ring or the benzenoid ring.

The groups which are singly bonded to the cyclic skeleton of the quinodimethane are referred to herein as the nuclear substituents and may be hydrogen, halogen, alkyl, aryl, alkoxy, or aryloxy radicals. These substituents of the dicyclic compounds may be the same or different, and may be on the quinoid ring or on the benzenoid ring or on both rings. The methylene groups which are doubly bonded to the quinodimethane ring may be unsubstituted methylene groups, i.e. ($CH_2=$), or they may be substituted with halogen, alkyl, aryl, aralkyl, alkoxy, and aryloxy groups without departing from the scope of this invention.

The preferred quinodimethanes are those of the group consisting of p-quinodimethane, 1,4-naphthaquinodimethane, and corresponding heterocyclic quinodimethanes containing at least one heteronitrogen atom vicinal only to carbon atoms and the nuclear substitution products of the foregoing members with atoms of the normally gaseous halogens and methyl groups.

Among the specific carbocyclic aromatic compounds which can be pyrolyzed to produce the aforesaid quinodimethanes which are used as a reactant in accordance with the process of this invention are: p-xylene; pseudocumene; durene; isodurene; prehnitene; pentamethyl benzene; hexamethyl benzene; 1,4-dimethyl naphthalene; 1,2,3,4,6,7 - hexamethyl naphthalene; 2-chloro-p-xylene; 2 - fluoro-p-xylene; 2,5 - difluoro-xylene; 2,5 - dichloro-p-xylene; 2,3,5-trichloro-p-xylene; 2,3,5 - trifluoro-p-xylene; 2,3,5,6 - tetrachloro - p - xylene; 2,3,5,6-tetrafluoro-p-xylene; 2-chloro-3,5,6-trimethyl benzene; 6-chloro-14,-dimethyl naphthalene; and 2,3,6,7-tetrachloro-1,4-dimethyl naphthalene. Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloropyrazine.

The pyrolysis of the aforesaid 1,4-dimethyl substituted aromatic compounds is preferably carried out at a temperature within the range of about 900° C. to about 1300° C., for example, at about 1000° C. For best results the aromatic vapor should be present at a partial pressure of less than 150 mm. mercury. The $NO_2$ can be prepared by pyrolysis of nitric acid or supplied from a separate source as illustrated below. The pyrolysis can be conducted in the presence of an inert gas, such as carbon dioxide, steam or nitrogen, particularly when the partial pressure of the aromatic compound is 10 mm. mercury or below. Within the preferred pyrolysis temperature range the contact time should be within the range of from about 0.1 to about 0.001 second. In those cases where the quinodimethane is the desired product, the pyrolyzed vapors are quenched in a liquid maintained at a temperature below 45° C.

The liquid used for quenching and storing of the quinodimethane may be of any composition which remains liquid at the necessary temperature range and which has a relatively low partial pressure at about —45° C. consistent with the upper total pressure limit of 400 mm. mercury pressure and preferably low enough to permit operation below 10 mm. mercury pressure. The liquid also should be substantially non-reactive with the quinodimethane formed, although liquids which react to some slight degree may be used. Among the specific liquids which may be used for quenching are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloroethyl benzene, o-fluoro toluene and 1,1-dichloroethane; carbonyl compounds of low freezing point such as acetone, methyl ethyl ketone and methyl isobutyl ketone; ethers of low freezing point, such as diethyl ether, ethyl n-propyl ether and tetrahydrofurane; alcohols of low freezing point, such as methanol, ethanol and isopropyl alcohol; and other normally liquid compounds of low freezing point, such as carbon disulfide. If desired, liquids of low freezing point may be obtained by the blending of two or more compounds of higher freezing point. For example, mixtures of carbon tetrachloride and chloroform may be used.

EXAMPLE

This example illustrates the results obtained by the pyrolysis of p-xylene and nitric acid under varying conditions.

A. *Co-pyrolysis of p-xylene and $HNO_3$ to produce nitrogen free compounds*

The pyrolysis system shown in L. A. Errede and B. F. Landrum, J. Am. Chem. Soc., 79, 4952 (1957), was modified to include a second vaporizer for metering aqueous $HNO_3$ (68%). The system was evacuated to 6 mm. Hg pressure and p-xylene (3.27 moles) and $HNO_3$ (1.05 moles) were metered to the system at the rate of 0.045 and 0.015 mole/min., respectively. The two gas streams were mixed before they entered the furnace where fast flow pyrolysis occurred at 1030° C. The pyrolyzate was collected in 4 liters of hexane kept at —78° C. The cold trap was warmed to room temperature to afford a three-phase mixture of hexane solution, aqueous acid solution (43 g.) and a black tar (9 g.). Large volumes of $NO_2$ were given off when the mixture was warmed to room temperature. The last traces were removed by a current of nitrogen. The hexane solution was washed with water and the solvent was removed by rapid evaporation at 100° C and mm. Hg pressure. The yellow liquid residue (154 g.) was a mixture of aldehydes and aromatic hydrocarbons having no $NO_2$ groups as indicated by infrared analysis and a negative qualitative test for $NO_2$ using ferrous ammonium sulfate in alcoholic potassium hydroxide. The mixture was separated by distillation at atmospheric pressure to give 3 main fractions. (1) 76 g., B.P. 137–141° C. This was identified by infrared analysis as p-xylene; (2) 32 g., B.P. 196–202° $n_D^{14}$=1.5433. This was identified as p-tolualdehyde by infrared analysis and by converting a sample to its 2,4-dinitrophenylhydrazone derivative (M.P. 229–230° C., no depression with known sample); (3) 35 g. residue. The residue was separated further by distillation at 2 mm. Hg pressure to give 3 additional major fractions. (1) 2.2 g., B.P. 67–80° C. Infrared analysis indicated that this was mostly p-tolualdehyde with some 1,4-di-p-tolylethane and diarylmethanes present as impurities; (2) 18.7 g., B.P. 125–137° C. Infrared analysis indicated that this was a mixture of 1,4-di-p-tolylethane, diarylmethanes and a small amount of acid material. The mixture was extracted with dilute sodium hydroxide and the residue was dissolved in methanol. The methanol solution was chilled to —78° C. to precipitate di-p-tolylethane (4.5 g.) in the form of pearl white platelets (M.P. 74–75° C., no depression with known sample). The methanol solution was evaporated to dryness leaving a residue (10 g.) which was a mixture of alkylated diphenylmethanes and 1,4-di-p-tolylethane as indicated by infrared analysis; (3) 9 g. residue, B.P. >150° C. Infrared analysis indicated that this was a complex mixture of aromatic hydrocarbons and some acidic material. The residue was leached with dilute sodium hydroxide. The alkaline extract was combined with corresponding extract from Fraction 2 and the resulting solution was acidified with hydrochloric acid to liberate the organic acid (3 g.) which was removed by filtration. The acid was recrystallized from hot water to yield p-toluic acid in the form of fine white needles (M.P. 174–175° C., no depression with known sample). The compound was also identified by its infrared spectrum.

Thus, 3.2 moles of p-xylene and 1.05 moles of $HNO_3$ were co-pyrolyzed to afford 0.28 moles of p-tolualdehyde, 0.02 moles of p-toluic acid, and 0.24 moles of p-methylbenzyl radical equivalents isolated as its daughter products, 1,4-di-p-tolylethane and diarylethane.

B. *Reaction of pyrolyzed p-xylene with non-pyrolyzed $HNO_3$ to produce nitrogen containing compounds* p-Xylene (1.8 moles) was metered at the rate of 0.025 mole/min, to the pyrolysis system evacuated to 2 mm. Hg. Pyrolysis occurred at 1030° C. for an average residence time of 0.006 sec. These conditions are known to produce about 0.2 mole of p-methylbenzyl radicals. At a point 6.5 inches downstream from the pyrolysis zone, the pyrolyzate was mixed with non-pyrolyzed 90% $HNO_3$ (10 moles), metered counter-current to the system at the rate of 0.142 mole/min. The temperature at the blend point was about 450° C. The gas mixture was collected about 3 feet from the blend point in hexane (4 liters) kept at —78° C. The absence of NO and $NO_2$ in the liquid nitrogen and Dry Ice traps, respectively, indicated that little or no thermal degradation of $HNO_3$ had occurred.

The resulting pyrolyzate solution was warmed to room temperature. About 1 g. of poly-(p-xylylene was isolated as film that adhered to the walls of the receiver about the level of the liquid. The acid aqueous and organic phases were separated by means of a separatory funnel.

The organic layer was extracted with dilute aqueous NaOH, but no organic acid was liberated when the alkaline solution was acidified with HCl. The hexane in the organic phase was removed by distillation at atmospheric pressure. The residue (26 g.) was separated by distillation at 8 mm. Hg pressure to give two fractions. (1) 11 g., B.P. 103–104° C. The infrared spectrum was similar to that of nitro-p-xylene. The index of refraction ($n_D^{27}$=1.536) and density ($n_D^{27}$=1.149) of the light yellow oil was in agreement with the corresponding data measured on known sample ($n_D^{27}$=1.539; $d^{27}$= 1.148). A small sample of this oil (1.5 g.) was oxidized by $K_2Cr_2O_7$ (11 g.) in $H_2SO_4$ and $H_2O$ to 3-nitro-p-toluic acid (M.P. 186–187° C.). (No depression with known sample.) (2) 15 g. residue. The infrared spectrum indicated that this was a mixture of nitro-aromatic compounds.

The aqueous $HNO_3$ plane was diluted with water and a copious precipitate formed immediately. The product (95 g.) was a mixture of nitroxylenes as indicated by infrared analysis. Repeated fractional crystallization from toluene and methanol gave three major fractions classified according to melting point. (1) 2.4 g., M.P.

97–98° C., the elementary analysis (49.3% C, 4.7% H, 13.4% N) corresponded to the empirical formula for dinitroxylene, $C_8H_8N_2O_4$ (C, 49.0; H, 4.1). The infrared spectrum, however, indicated that this was a mixture of nitroxylenes, probably the 2,3 and the 2,6-di-nitro-p-xylylene since these are known to form a one to one adduct that melts at 99° C. (2) 40 g., M.P. 95–102° C.; infrared spectrum was similar to Fraction 1 and indicated a mixture of nitro-xylenes. (3) 51 g., M.P. 79–88° C. This too was a mixture of nitro-xylenes as indicated by infrared analysis. Fractions 2 and 3 and the nitroxylenes residue from the organic layer were reconstituted and an attempt was made to separate the product by liquid chromatography. The results were no better than those realized via fractional recrystallization. A small sample (1 g.) M.P. 92–93° C. was isolated, however, which could be 2,3-di-nitro-p-xylene (lit. 93° C.)

In summary, 1.8 moles of p-xylene were pyrolyzed and the pyrolyzate was quenched with 10 moles of non-pyrolyzed $HNO_3$ to give about 0.55 mole of di-nitro-p-xylene (30% yield) and about 0.07 mole of nitro-p-xylene (4% yield). No organic acid or aldehydes were isolated despite the formation of about 0.2 mole of p-methylbenzyl radicals before quenching with $HNO_3$.

C. Co-axial pyrolysis of p-xylylene and $HNO_3$

The internal thermowell of the pyrolysis system used in A above was replaced by an open end quartz tube through which $HNO_3$ could be metered to the pyrolysis system. This tube extended to a point 3 inches beyond the furnace so that blending of the pyrolyzed nitric acid stream and the pyrolyzed p-xylene stream would occur at a point 6.5 inches away from the pyrolysis zone. The space in the outer concentric tube between the pyrolysis zone and the blend point was filled with five quartz tubes (6" long, 6 mm. O.D., 4 mm. I.D.) to ensure complete conversion of p-methylbenzyl radicals to p-xylylene in the p-xylene pyrolyzate before the hydrocarbon stream reached the blend point. The temperature was recorded by means of a sliding thermocouple placed between the furnace and the outer pyrolysis tube. The system was evacuated to 4 mm. Para-xylene (1.98 moles) and $HNO_3$ (3.4 moles) were metered separately to the system through the concentric tubes at the rate of 0.016 and 0.027 moles/min., respectively. Pyrolysis of p-xylene occurred at 930° C. for 0.01 sec. (conditions which are known to give about 0.24 mole of p-methylbenzyl radicals). The pyrolyzate mixture was collected in hexane (4 liters) kept at −78° C. The resulting mixture was warmed to room temperature with evolution of $NO_2$. The last traces of $NO_2$ were removed by a stream of nitrogen. A three-phase system was obtained and this was separated into its aqueous liquid and organic solid components. The solid (27 g.) was dissolved in aqueous $Na_2CO_3$. The organic phase was extracted with aqueous $Na_2CO_3$. The two alkali carbonate solutions were combined and then acidified with aqueous HCl. The organic acid liberated (26 g., 0.16 mole) was collected by filtration. The acid was leached with methanol but none dissolved indicating the absence of p-toluic acid. The acid did not melt below 300° C. Its infrared spectrum was substantially identical with that of terephthalic acid. A small sample was converted to its dimethyl ester by treatment with fused $PCl_5$ and subsequent addition to methanol. The melting point of the dimethyl terephthalate (M.P. 138–139° C.) produced in this way showed no depression when mixed with a known sample. The hexane solution was evaporated to dryness and a mixture of aromatic hydrocarbons was obtained as residue (9 g.).

Thus, pyrolysis of p-xylene (1.98 moles) was carried out in such a way as to afford about 0.24 mole of p-methylbenzyl radicals and about 70% of these were isolated as terephthalic acid and about 30% as a mixture of aromatic hydrocarbons (1,2-di-p-tolylethane, methylated diphenyl methanes and anthracenes).

D. Pyrolyzed p-xylene collected in the presence of $HNO_3$ to produce nitrogen containing compounds p-Xylene (1.88 moles) was pyrolyzed at 1000° C. and 4 mm. for 0.008 sec. residence time. The pyrolyzate was collected in a slurry of solid $HNO_3$ (8.5 moles) in toluene (4 liters) kept at −78° C. The reaction mixture was warmed to room temperature and separated. No organic acid was isolated. 22% of the p-xylene metered to the system was isolated as nitro-p-xylene, 2% as di-nitro-p-xylene, 6% as nitrated poly-(p-xylylene) containing 7.4% N and 1% as p-methylbenzyl nitrate (B.P. 110–111° C. at 10 mm., $n_D^{25.5}=1.5174$, $d^{25.5}=1.153$).

Calc. for $C_8H_9NO_3$: C, 57.49; H, 5.42; $MR_D$, 43.57. Found: C, 57.7; H, 5.35; $MR_D$, 43.7.

A sample of p-methylbenzyl nitrate was prepared by reaction of pulverized $AgNO_3$ with p-methylbenzyl chloride in ether. The physical constants and the infrared spectra of this sample were substantially the same as those given above.

E. Co-axial pyrolysis of p-xylene and $NO_2$ to produce nitrogen free compounds The pyrolysis system of C above was evacuated to 5 mm. p-xylene (7.3 moles through the outer tube) and $NO_2$ (25.6 moles through the inner tube) were metered to the system at the rate of 0.0545 and 0.175 mole/min., respectively. Pyrolysis of p-xylene occurred at 1000° C. for 0.002 sec. and the two pyrolyzate streams were allowed to blend at a point 6.5 inches away from the end of the mutual pyrolysis zone. Previous experiments had shown that the pyrolysis conditions used in this experiment afford about 0.18 mole of p-methylbenzyl radicals and that about 40% of these are converted to p-xylylene by the time the hydrocarbon stream reaches the blend point where the temperature is about 450° C. The pyrolyzate mixture was collected in hexane kept at −78° C. When the resulting solution was warmed to room temperature, the usual three phase mixture was obtained. The solid (9 g.) was removed by filtration, dissolved in aqueous $Na_2CO_3$ and reprecipitated by addition of HCl. This product was identified as terephthalic acid by its infrared spectrum. The organic layer was extracted with aqueous $Na_2CO_3$. Acidification of the extract with dilute HCl gave 11 g. of impure p-toluic acid (165–170° C.). The organic layer was evaporated to dryness and a mixture of aromatic hydrocarbons (1,2-di-p-tolylethane and diarylmethanes) was obtained as residue (6 g.).

I claim:

1. A method for the preparation of aromatic carboxylic acid comprising the steps of:
   (a) pyrolyzing a gas stream comprising p-xylene,
   (b) pyrolyzing a gas stream comprising a material selected from the group consisting or $HNO_3$ and $NO_2$,
   (c) blending the respective resulting streams of pyrolyzates at temperatures below the pyrolysis temperatures, and
   (d) recovering aromatic carboxylic acid from the reaction products of the combined pyrolyzate streams.

2. In a method for the preparation of terephthalic acid from p-xylylene, the improvement which comprises contacting under vapor phase conditions at an elevated temperature p-xylylene with a previously pyrolyzed material selected from the group consisting of $HNO_3$ and $NO_2$.

3. A method for the preparation of terephthalic acid comprising the steps of:
   (a) pyrolyzing p-xylene under conditions such that p-xylylene is produced,
   (b) pyrolyzing a material selected from the group consisting of $HNO_3$ and $NO_2$,
   (c) blending the pyrolyzates at temperatures below the pyrolysis temperature, and
   (d) recovering terephthalic acid from the products of the blended pyrolyzates.

4. The method of claim 3 wherein the blended py-

| 7 | 8 |
|---|---|
| rolyzates are quenched in a non-reactive liquid having a relatively low partial pressure at a temperature of about −45° C. | FOREIGN PATENTS<br>662,139 12/1951 Great Britain.<br>823,437 11/1959 Great Britain. |
| References Cited by the Examiner<br>UNITED STATES PATENTS<br>1,694,122 12/1928 Jaeger _____ 260—524 | LORRAINE A. WEINBERGER, *Primary Examiner.*<br>S. B. WILLIAMS, *Assistant Examiner.* |

UNITED STATES PATENT OFFICE
CERTIFICATE OF CORRECTION

Patent No. 3,299,126　　　　　　　　　　　　　　　January 17, 1967

Louis A. Errede

It is hereby certified that error appears in the above numbered patent requiring correction and that the said Letters Patent should read as corrected below.

Column 2, line 43, for "14" read -- 1,4 --; column 3, line 47, for "3.27" read -- 3.17 --; column 4, line 70, for "plane" read -- phase --.

Signed and sealed this 21st day of November 1967.

(SEAL)
Attest:

Edward M. Fletcher, Jr.　　　　　　　　　　　　　　EDWARD J. BRENNER
Attesting Officer　　　　　　　　　　　　　　　　　　Commissioner of Patents

UNITED STATES PATENT OFFICE
CERTIFICATE OF CORRECTION

Patent No. 3,299,126　　　　　　　　　　　　　　　　January 17, 1967

Louis A. Errede

It is hereby certified that error appears in the above numbered patent requiring correction and that the said Letters Patent should read as corrected below.

Column 2, line 43, for "14" read -- 1,4 --; column 3, line 47, for "3.27" read -- 3.17 --; column 4, line 70, for "plane" read -- phase --.

Signed and sealed this 21st day of November 1967.

(SEAL)
Attest:

Edward M. Fletcher, Jr.　　　　　　　　　　　　EDWARD J. BRENNER
Attesting Officer　　　　　　　　　　　　　　　Commissioner of Patents